US010723406B2

(12) United States Patent
Brewer et al.

(10) Patent No.: US 10,723,406 B2
(45) Date of Patent: Jul. 28, 2020

(54) INTRODUCED IN FOLDING ELLIPTICAL BICYCLE

(71) Applicant: Aruanã Energia S/A, Goiânia (BR)

(72) Inventors: Brian Ray Brewer, Florianópolis (BR); Robert McKinnon, Florianópolis (BR)

(73) Assignee: Aruana Energia S/A (BR)

( * ) Notice: Subject to any disclaimer, the term of this patent is extended or adjusted under 35 U.S.C. 154(b) by 263 days.

(21) Appl. No.: 15/957,680

(22) PCT Filed: Mar. 31, 2017

(86) PCT No.: PCT/BR2017/000026
§ 371 (c)(1),
(2) Date: Apr. 19, 2018

(87) PCT Pub. No.: WO2018/152599
PCT Pub. Date: Aug. 30, 2018

(65) Prior Publication Data
US 2019/0256165 A1    Aug. 22, 2019

(30) Foreign Application Priority Data

Feb. 24, 2017    (BR) .......................... 1020170039897

(51) Int. Cl.
*B62K 15/00* (2006.01)
*B62K 3/00* (2006.01)
*B62M 1/26* (2013.01)

(52) U.S. Cl.
CPC ............ *B62K 15/006* (2013.01); *B62K 3/002* (2013.01); *B62K 15/00* (2013.01); *B62M 1/26* (2013.01)

(58) Field of Classification Search
None
See application file for complete search history.

(56) References Cited

U.S. PATENT DOCUMENTS

| 5,337,609 A * | 8/1994 | Hsu | B62K 15/006 |
|---|---|---|---|
| | | | 280/278 |
| 7,232,143 B1 * | 6/2007 | Ferguson | B62K 15/006 |
| | | | 280/278 |

(Continued)

FOREIGN PATENT DOCUMENTS

| BR | 302017000886-0 | 5/2017 |
|---|---|---|
| BR | 302017001038-5 | 5/2017 |

Primary Examiner — Kevin Hurley
Assistant Examiner — Harold Eric Pahlck, III
(74) Attorney, Agent, or Firm — Aldo Noto, Esq.; Davidson Berquist Jackson & Gowdey, LLP

(57) ABSTRACT

An elliptical bicycle comprises a structural frame including two stringers in opposing arcs, one upper and the other lower, a front wheel and a rear wheel driven by a crankset from its support platforms, as well as a steering box formed by fork, steering tube and handlebar. The elliptical bicycle has multiple hinges. The structural frame is provided with a set of main hinges, each applied to a bipartite stringer having an articulation at an approximate angle of up to 170°. A secondary hinge is applied in a bipartite steering tube of the handlebar having an articulation at an approximate angle of up to 180°. A set of tertiary hinges is applied between a crankset and support platforms of the user's feet, each of them having an articulation at an approximate angle of up to 90° upwards.

6 Claims, 11 Drawing Sheets

(56) References Cited

U.S. PATENT DOCUMENTS

| | | | |
|---|---|---|---|
| 7,717,446 B2 * | 5/2010 | Pate | B62M 1/26 |
| | | | 280/221 |
| 7,967,313 B1 * | 6/2011 | Eggert | B62K 5/02 |
| | | | 280/224 |
| 8,579,769 B2 * | 11/2013 | Sans | B62K 3/002 |
| | | | 280/221 |
| 9,260,156 B2 | 2/2016 | Brewer | |
| 9,592,883 B2 | 3/2017 | Brewer | |
| 2003/0001350 A1 * | 1/2003 | Eschenbach | B62K 3/002 |
| | | | 280/63 |
| 2018/0050231 A1 * | 2/2018 | Teal | A63B 22/0015 |
| 2019/0168840 A1 * | 6/2019 | Ruz Campos | B62M 1/26 |
| 2019/0344854 A1 * | 11/2019 | Lewis | B62M 9/12 |

\* cited by examiner

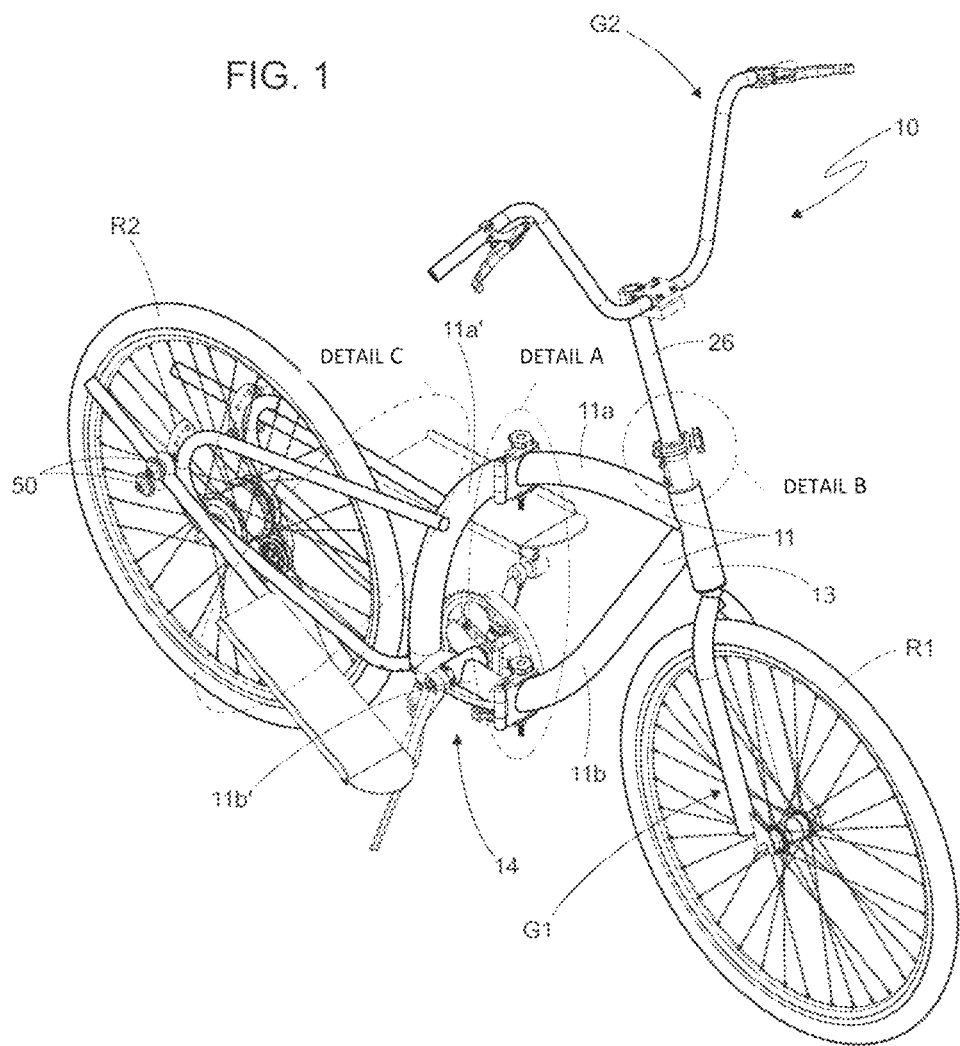

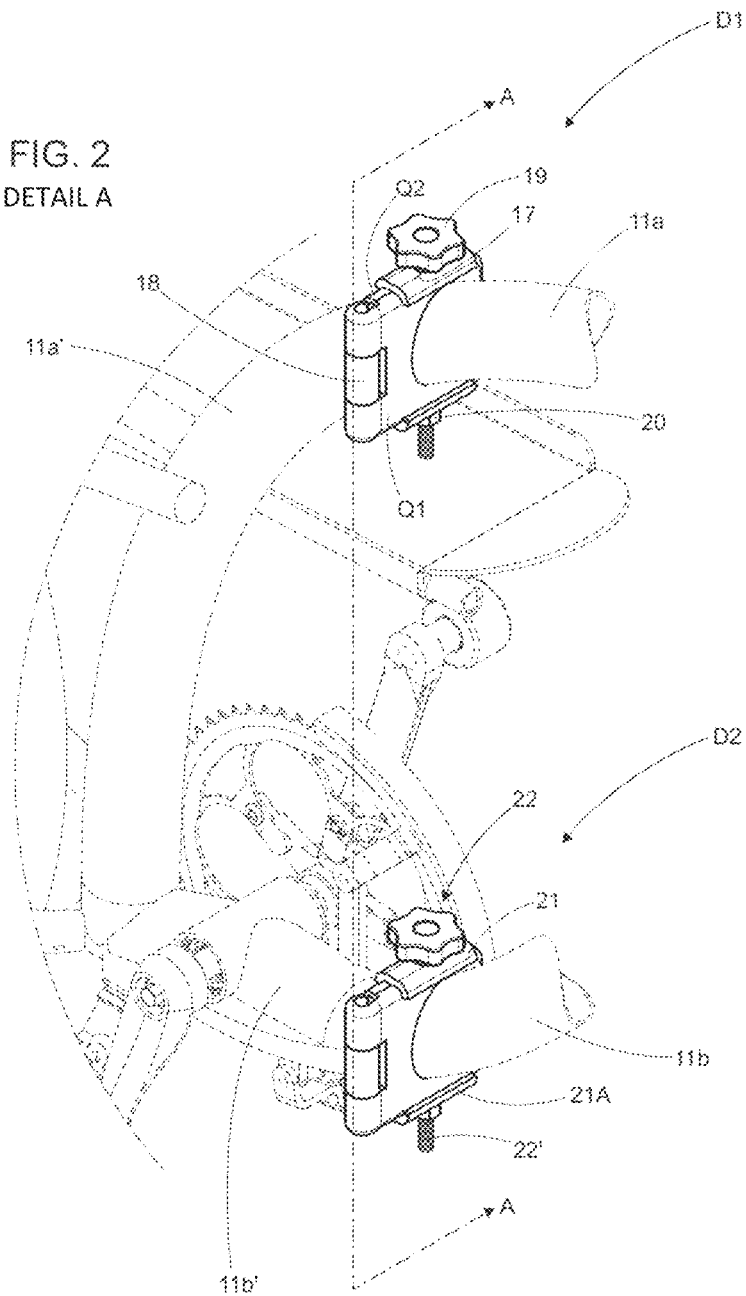

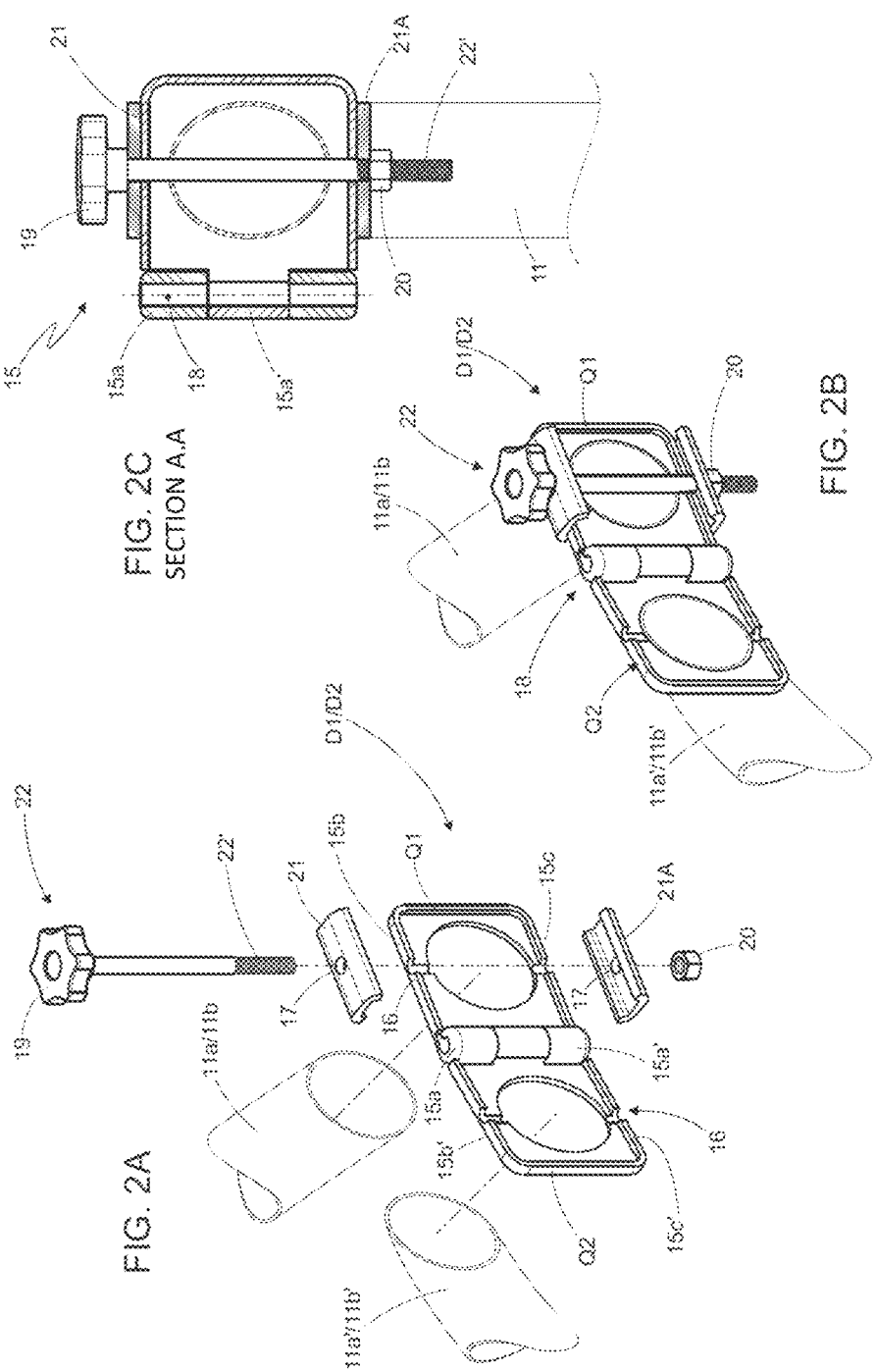

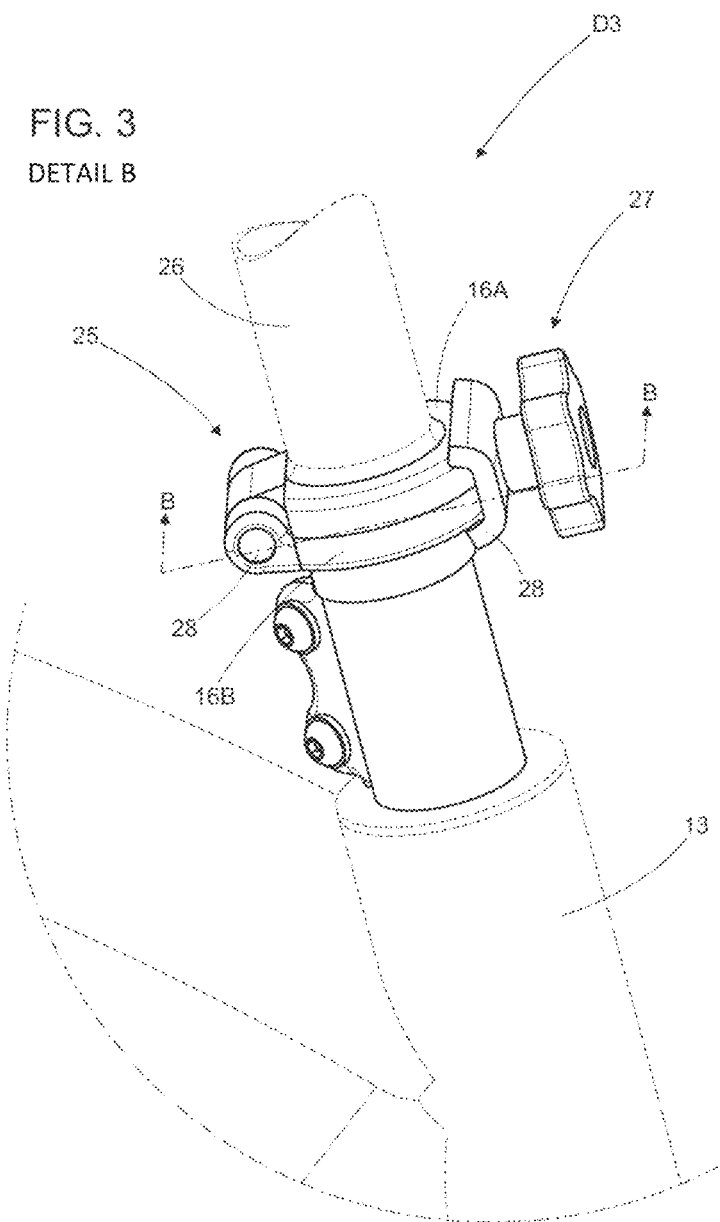

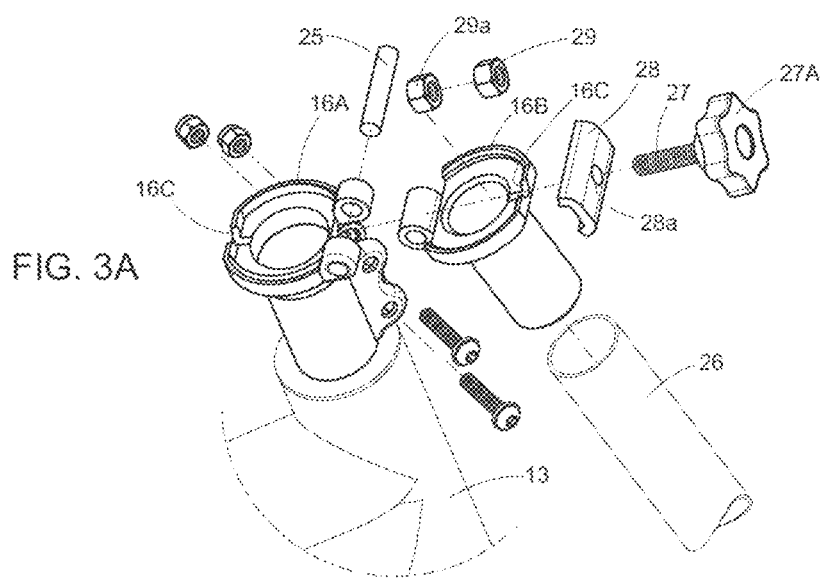
FIG. 3A
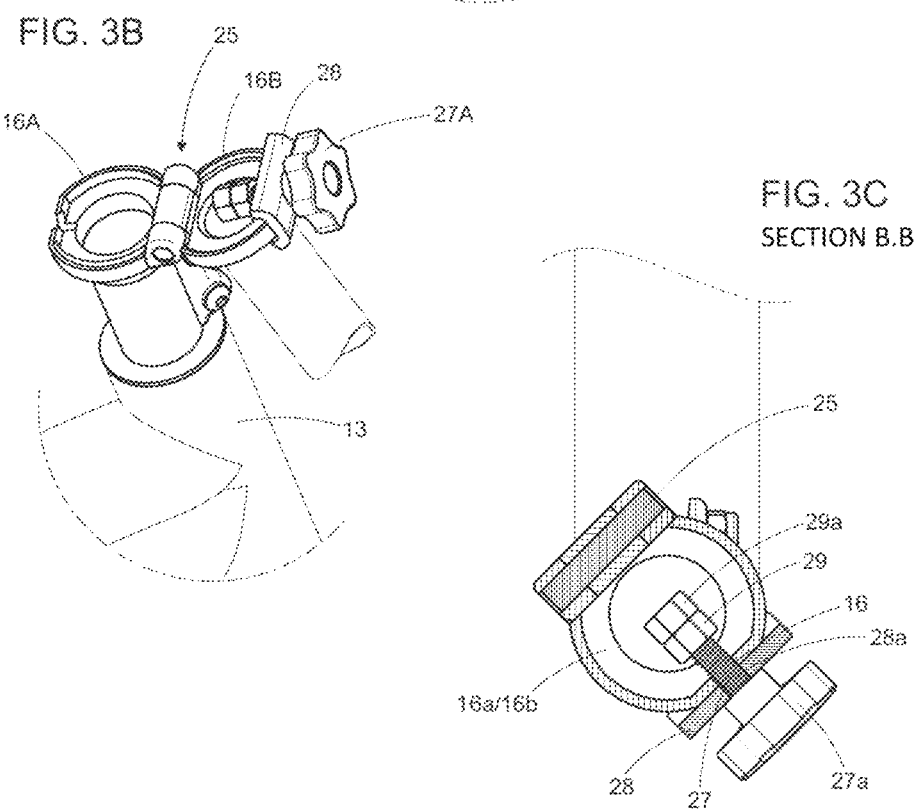
FIG. 3B
FIG. 3C
SECTION B.B

DETAIL C

SECTION C.C

INTRODUCED IN FOLDING ELLIPTICAL BICYCLE

TECHNICAL FIELD OF THE INVENTION

The present invention relates to improvements in a folding elliptical bicycle of the type used for practicing physical exercise and recreation where, notably, said elliptical bicycle has innovative constructive features, especially aimed at the prediction of articulated hinge points with respective locks applied in the bipartite frame, handlebars and pedals that enable the dimensional compaction of the elliptical bicycle, so as to facilitate the storage and transport for both commercial establishments and users.

BACKGROUND OF THE INVENTION

The use of a bicycle, as it is widely known, brings several benefits such as the reduction of sedentarism and diseases, and the fight against obesity, among other pathologies, and also composes an alternative mode of transportation which is environment-friendly, reducing the pollutant gas indices from conventional cars.

Currently, there are several model types of bicycles such as speed, mountain bikes, hybrid, ride bicycle, leisure, rim 26, rim 29, with front suspension, among others, which, in a general, are comprised with monobloc frames where front and rear forks, wheels and tires, ratchet, movement transmission mechanism, saddle, handlebar, brake mechanism, as well as other equipments such as basket, child seat, etc. are installed.

Another known bicycle model consists of "folding," which presents all the aforementioned components, but more specifically, the structural frame has a bipartite stringer; to ensure the assembly of the hinge, each joint end of the stringer has a diametric flare, in order to form a peripheral collar for the assembly of a pivot axis, as well as a locking device which may be in the form of a pin, tabs or similar.

These conventional folding bicycles have several advantages, mainly in the use in urban centers, where the compactness performed by the pivoting of the structural frame facilitates the transportation, such as in the trunk of cars, public transport such as buses, trains, subways, etc.

Similarly, "elliptical" bicycles are also known; they promote all the benefits already mentioned of the ordinary bicycle, with some additional ones, that is, they help the development of different parts of the musculature, since the way of using the bicycle by the user is "standing" and not "sitting" as in the ordinary bicycle, that is, the user supports the feet on platforms, standing upright while driving the bicycle, fully eliminating the use of saddles. Namely, said elliptical bicycle is comprised of a structural frame with at least two wheels, one front and the other rear, and includes a drive mechanism of a crankset associated with the ratchet by mean of the belt and where the crankset is driven by a pair of platforms, each of them with one end mounted to one arm of the crankset and another end hinged to the respective support arranged at the rear of the frame, proximate the rear wheel. Thus, the alternating movement of the platforms between lifting and lowering of each support platform promotes the movement of the bicycle forward.

The applicant, acting in the area as developer of elliptical bicycle mechanisms and similar, is the Applicant of protocol document n°. BR102012028693 that refers to a bicycle which drive assembly allows it to be driven by the cyclist in an erect position and, for this purpose, provides that each of the pedals is pivoted by its front end, at the ends of the respective cranksets; each of the pedals has continuity on a guide rod; the guide rods are, in turn, supported on the rear assembly of the sliding supports, which assembly is formed by a transverse tube incorporated horizontally to the frame and receiving, at each of its ends, a roller which channel is sized to accommodate the cross section of the guide rod.

The document n° BR10.2013.025840-7, of the same applicant, refers to elliptical velocipede as bicycles, tricycles and scooters having tubular stringer where the basic parts are assembled, namely: fork, handlebar support, front wheel, rear wheel, central crown, cranksets, as well as, the elliptical drive mechanism and steering mechanism.

Other models of elliptical bicycles are known in the market, since this type of velocipede has become an increasingly common vehicle, but although these models of 'elliptical' bicycles bring numerous benefits to users, it should be noted that none of them is foldable, that is, because the support platforms of the feet are elongated and the frame is differentiated relative to the usual bicycles, the dimensional reduction is somewhat more complex, such fact fully solved by the present invention, which made the bicycle 'elliptical' with greater ease of storage and transportation, increasing the possibility of the diffusion of this mobility model.

ANALYSIS OF THE STATE OF THE ART

In research carried out in specialized databases were found documents concerning the folding bicycle, such as, document N° BR 11 2013 005410 7 which refers to a hinged frame and which, for this purpose, has a locking device similar to a lever to enable tightening and loosening, in addition to allowing the articulation of the frame parts and being able to be diverted horizontally to the side of the pivot axis.

Another document n° MU 8600044-6 also refers to an articulable bicycle, which in addition to its articulated frame also provides the articulation of the handlebar so that it is behind the first articulation device, thus, enabling the tires to be parallel.

The document n MU 8702687-2 refers to an articulable bicycle having a pivoting device where there are two distinct locks cooperating in order to enable the assembly to be folded or unfolded, in addition it contains a lever and a pin, which aid in the opening of the parts; said pin rotates about a certain joint.

Another document n° WO2012037798, refers to a bicycle which is articulable in three points, two in its frame and one its handlebars, the articulations are vertical.

The documents n°s KR101467145 and CN104210598, refer to bicycles that have joints with levers and pins that aid its rotation.

Another document n° CN204056145 describes a lever and also has a kind of rod that accompanies the second bipartite part of the frame, aiding it as a support.

The documents n°s PI 0317515-4 and DE202007008395 present pedals which articulate vertically fixed in cranksets.

Although these documents present folding bicycles with different types of fittings and joints, such bicycles and mechanisms differ from those practiced on the innovative 'elliptical' bicycle, especially regarding the points and articulation devices of the extended support platforms, as well as the other points of articulation that allow to reduce, considerably, the dimensional of the 'elliptical' bicycle.

OBJECTS OF THE INVENTION

The improvements introduced in the folding elliptical bicycle have been developed to provide comfort of transportation and easy storage to the user. The innovation of the elliptical bicycle lies in the fact that it provides in the structural frame a set of hinges that allow the articulation of the frame at an approximate angle of up to 170°, as well as a hinge applied in the support tube of the handlebars that allow the articulation at an approximate angle of up to 180° and a set of hinges applied between the crankset and the support platforms of the foot that allow an articulation at an angle of 90° upwards which, when fully articulated, ensure folds in the elliptical bicycle in order to substantially reduce the size thereof, to provide improvements in the storage and transportation, which enable the user's freedom of movement and ability to use the bicycle and take it on buses and subways, without taking up too much space.

Another advantage lies in the fact that none of the other existing products on the actual market can be folded, because their elliptical actuation systems do not permit folds in view of the constructive way necessary to produce elliptical movements.

DESCRIPTION OF THE FIGURES

Complementing the present description in order to obtain a better understanding of the features of the present invention and according to a preferred practical embodiment thereof, the description presents a set of drawings attached, where, in exemplified fashion, although non-limiting, its operation was represented:

The FIG. 1 discloses an assembled perspective view of the folding elliptical bicycle in the use position illustrating all pivoting points;

Figure 4:
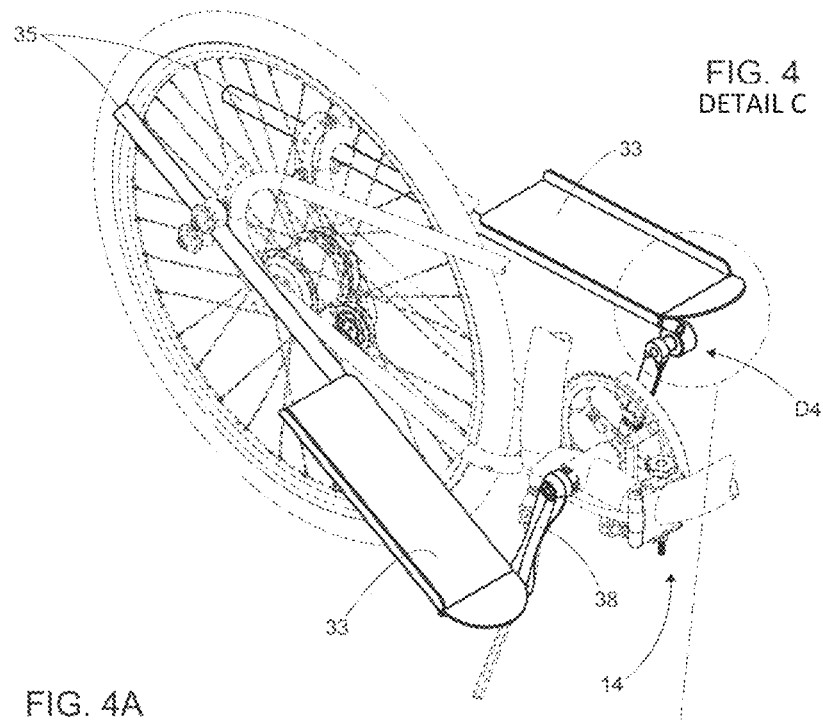
Figure 4A:
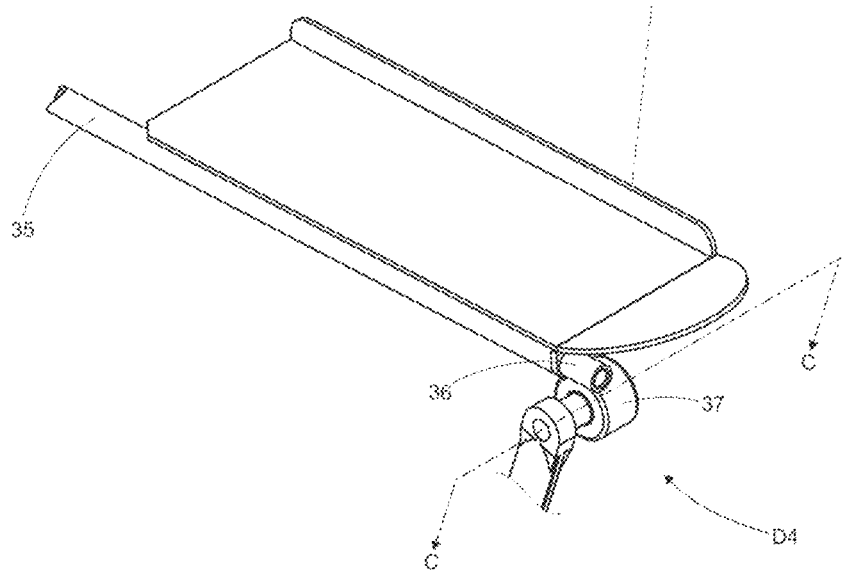
Figure 4B:
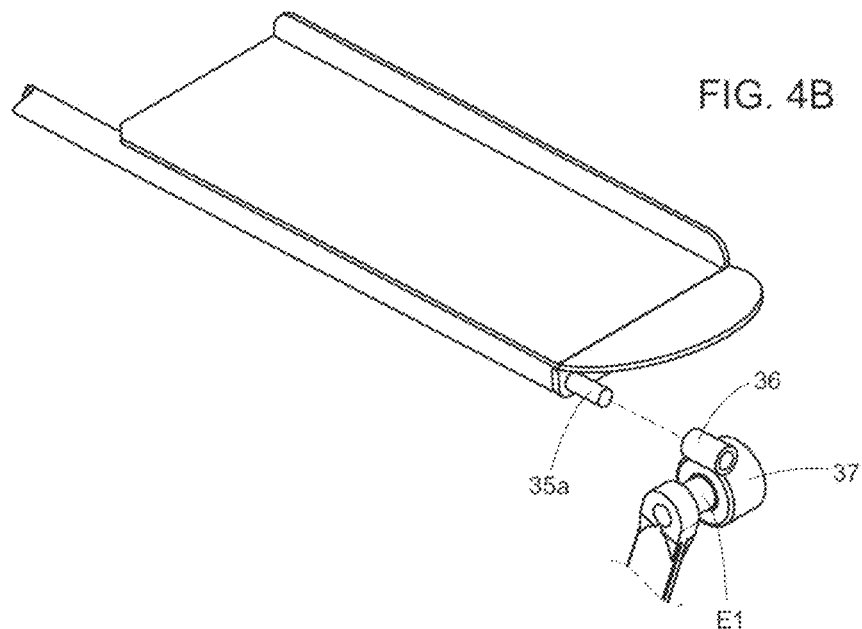
Figure 4C:
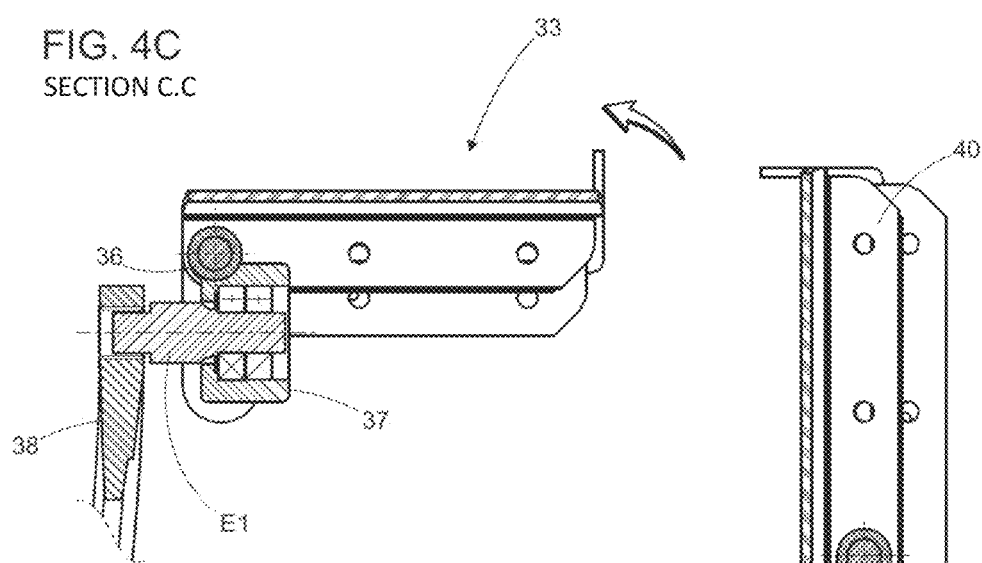

The FIG. 2 illustrates an enlarged detail view 'A' indicated in the previous figure of the main hinge provided in the bipartite frame;

The FIG. 2A depicts an exploded view of the main hinge;

The FIG. 2B illustrates a view of the main hinge opened;

The FIG. 2C discloses a cross-sectional view A.A of the main hinge;

The FIG. 3 shows an enlarged detail view 'B' indicated in FIG. 1 illustrating the secondary hinge applied in the tubular segment;

The FIG. 3A depicts an exploded view of the secondary hinge;

The FIG. 3B illustrates a view of the secondary hinge compacting;

The FIG. 3C shows the cross-section B.B of the secondary hinge;

The FIG. 4 discloses an enlarged detail view 'C' indicated in FIG. 1 illustrating the tertiary hinges applied on the support platforms;

The FIG. 4A depicts an assembled view of the support platform and the tertiary hinge device;

The FIG. 4B illustrates an exploded view of the support platform and the tertiary hinge device;

The FIG. 4C illustrates a cross-sectional view C.C of the tertiary hinge

Figure 4D:
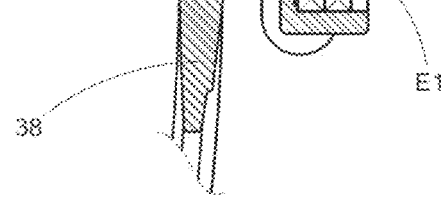
Figure 5:
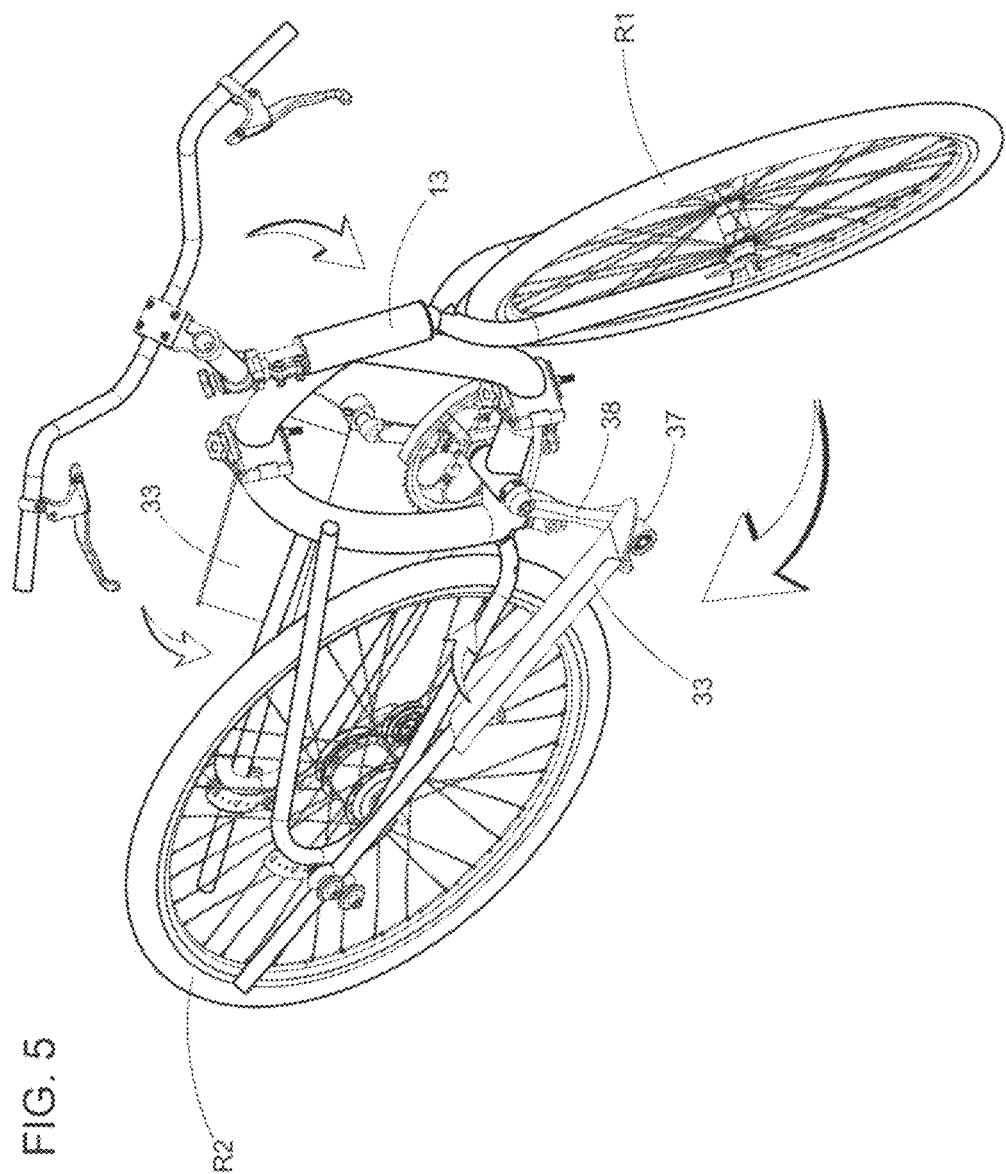
Figure 6:
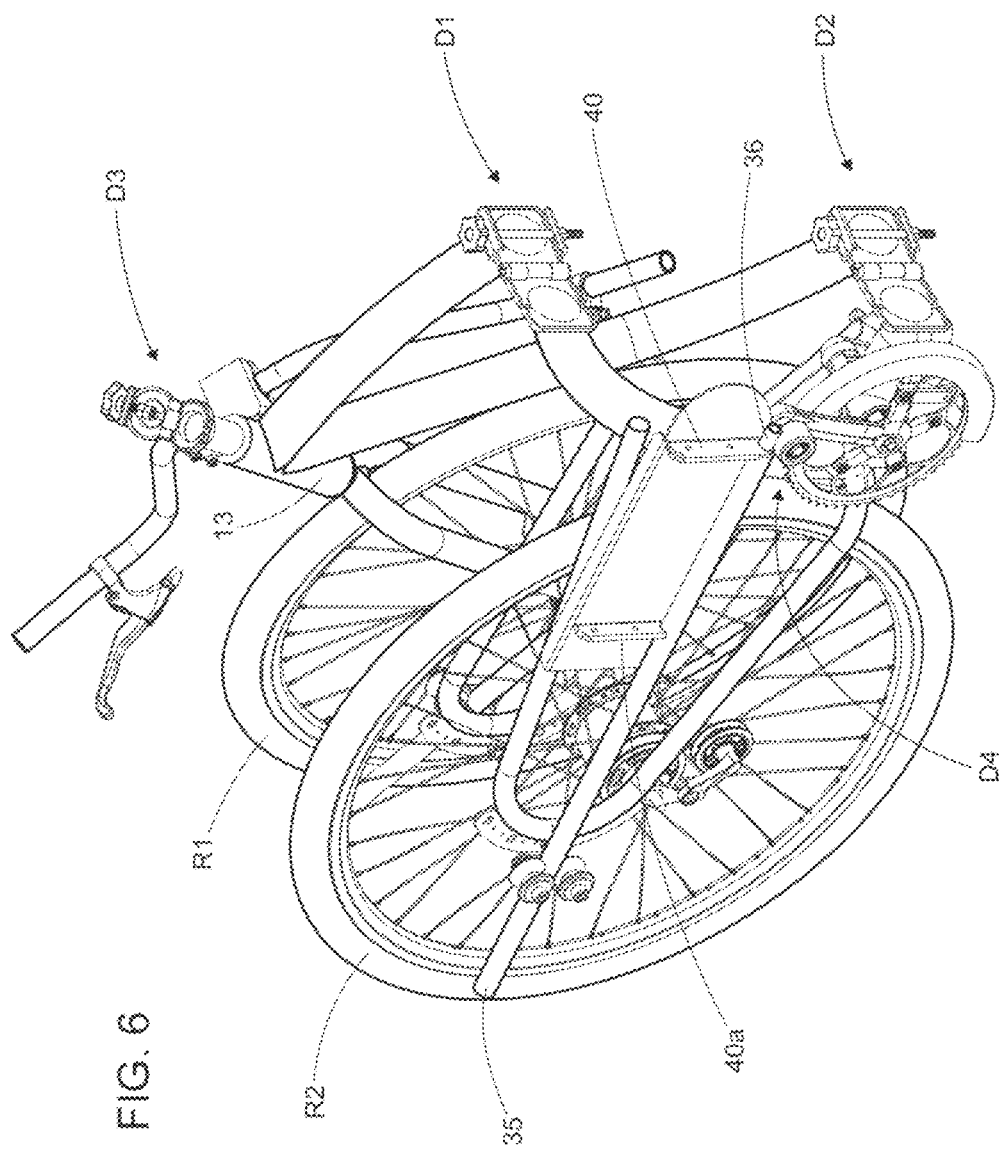
Figure 6B:
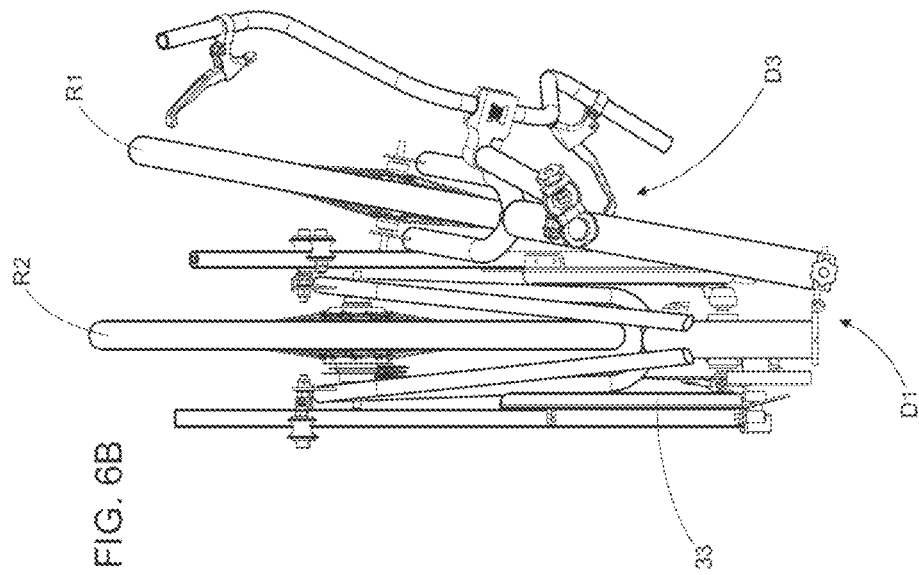
Figure 6A:
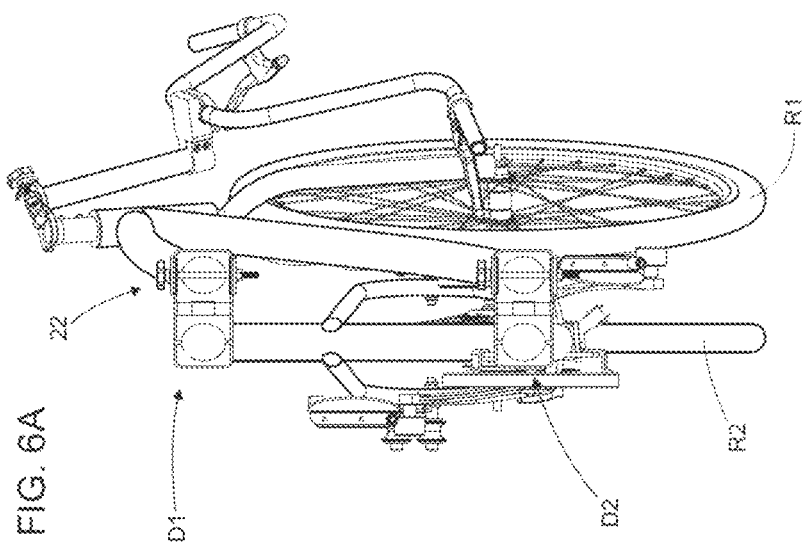
Figure 6C:
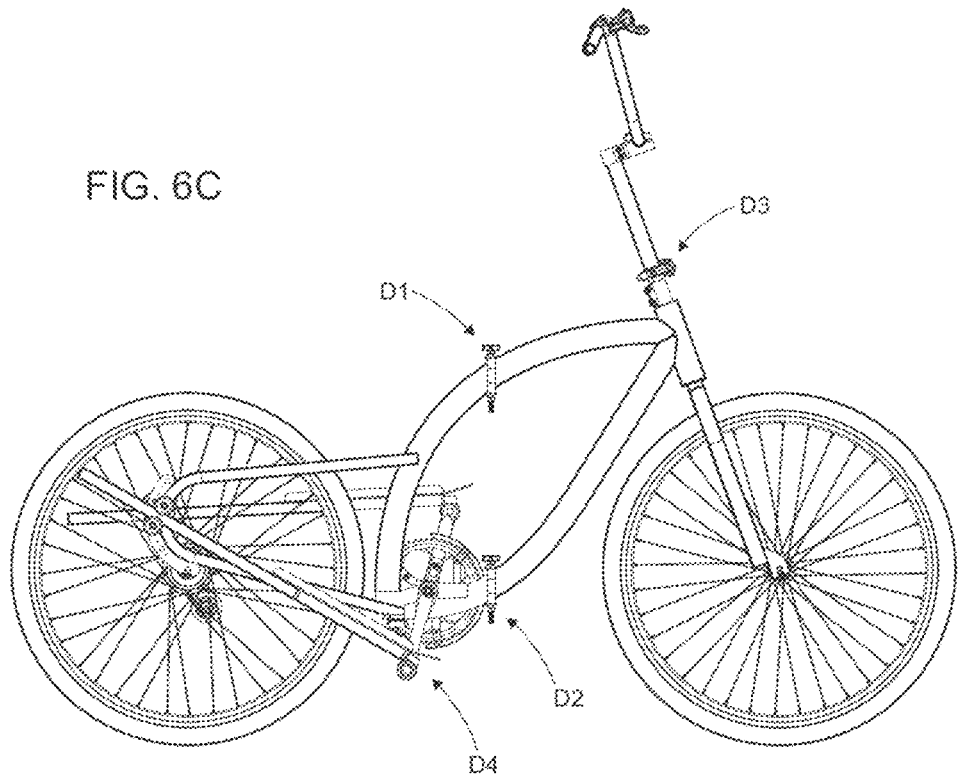

The FIG. 4D shows the same cross-sectional C.C, but hinged at 90°;

The FIG. 5 depicts a perspective view of the bicycle in the compacting position;

The FIG. 6 shows a perspective view of the bicycle in a compacted position illustrating all hinges pivoted;

The FIGS. 6A and 6B show the front and top views of the bicycle in the compacted position;

The FIG. 6C discloses a side view of the extended bicycle; and

Figure 6D:
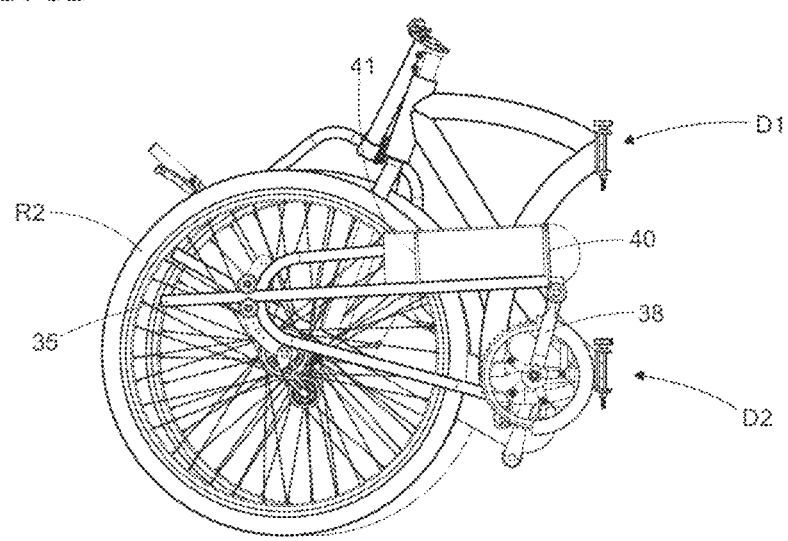

The FIG. 6D shows a side view of the bicycle compacted.

DESCRIPTION OF THE INVENTION

Referring to the illustrated drawings, the present invention relates to "IMPROVEMENTS INTRODUCED IN FOLDING ELLIPTICAL BICYCLE," more precisely it refers to an elliptical bicycle (10) comprising a structural frame (11) comprised of two stringers in opposing arcs, being one upper and other lower, each of them is bipartite into segments (11a) and (11a') and (11b) and (11b'), and which joints are joined by main hinges (D1) and (D2), respectively, with articulation at 170°. Said frame (11) has its front part coupled to a tubular segment (13) responsible for the fork support (G1) of the front wheel (R1) and the steering tube (26) of the handlebar (G2), such steering tube (26) being bipartite and joined by the secondary hinge (D3) with articulation at 180°. The other end of the frame (11) joins the bearing of the tubular segment (35) of the crankset (14) which, in turn, through each rod (38), has a respective tertiary hinge (D4), responsible for articulating a bar (35) of the support platform (33) at an angle of 90°, the support bar (35) having its other end installed in a pair of double bearings (50) arranged in the region of the rear wheel (R2).

The hinges (D1), (D2), D3) and (D4), when disassembled, allow the elliptical bicycle to be reduced by up to ⅓ of its volume.

Each main hinge (D1) and (D2) of frame (11) (See FIG. 2) is comprised of two quadrangular plates (Q1) and (Q2) of equal shape and size which, when closed, are kept in juxtaposed; the dimension of said quadrangular plates (Q1) and (Q2) slightly exceeds the diameter of the tubular stringers (11a) and (11a') and (11b) and (11b1 which, in turn, are integral with the outer faces of said plates (Q1) and (Q2) in order to configure an reinforcement bulkhead in single-piece of each bipartite sector of each stringer. A vertical side edge (15a) and (15a') of each plate (Q1) and (Q2) is joined by the pivot pin (18), while the other edges are free to open and close pivoting of up to 170°. The upper edges (15b) and (15b') and lower edges (15c) and (15c') of each plate (Q1) and (Q2) have a semicircular recess (16) which, when the plates (Q1) and (Q2) are Juxtaposed with each other, comprise coaxial holes having diameter compatible with the diameter of a stud (22) comprised by spindle with a threaded end (22') and handle (19). Said upper edges (15b') and (15b') and lower edges (15c') and (15c') are fixed by means of locks (21) and (21A), responsible for making the hinge assembly stable. Said locks have, each of them, a central hole (17) which, when coincident with said holes (16), allows the passage of the stud (22) until the thread (22') reaches the nut (20), obtaining the locking of each main hinge (D1) and (D2) when tightening the stud relative to the nut, in order to keep the frame (11) in an armed position, that is, ready to use the bicycle. When it is necessary that the frame (11) of the bicycle be hinged, the stud (22) is loosened relative to the nut (20) in such a way as to slightly loosen each lock, releasing the hinge of the plates (Q1) and (Q2) on the pin (18).

The secondary hinge (D3) (see FIGS. 3, 3A, 38 and 3C), installed in the tubular segment (13), has a similar function to the main hinges (D1) and (D2) and comprises, in turn, two hollow discs (16a) and (16b) and a diameter slightly larger than the diameter of the steering tube (26), said discs (16a) and (16b) being joined in one side by a pivot pin (25), while the opposing sides of each of the discs (16a) and (16b) have, respectively, a central recess (16c). When the discs (16a) and (16b) are joined and juxtaposed with one another, the edges where the holes (16c) are applied receive a lock (28) with a central hole (28a) which, when coaxially mounted relative to the hole formed by the recesses (16c), allows the passage of a threaded pin (27) with the handle (27a) acting relative to a nut (29) and a lock nut (29a), both housed inside the hollow part of the discs (16a) and (16b).

Upon tightening of the threaded pin (27) relative to the nut and lock nut, the lock (28) is tightly locked in order to keep the disks (16a) and (16b) juxtaposed, while maintaining the straight alignment of the steering tube (26) ready for the use of the bicycle. When it is necessary that the steering tube (26) to be hinged, the threaded pin (27) is loosened through the handle (27a) in order to slightly loosen the nut (29) relative to the lock nut (29a), loosening, thereby the lock (28), releasing the articulation of the discs (16a) and (16b) in a hinge of up to 180° in order to allow the handle (G2) to rest on the side of the bicycle, close to the wheels (R1 and R2), with the frame (11) fully folded.

The tertiary hinges (D4) (see FIGS. 4 to 4D) are respectively applied between a rod (38) of the crankset (14) and a support platform (33), each hinge (D4), consisting of a circular bearing (37), properly mounted on the rotation axis (E1) of the rod (38) and having the transverse attachment of a short cylindrical segment (36), which attachment can be made by welding or other means in the upper part of said bearing. Said cylindrical segment (36) receives the engagement of the cylindrical end (35a) of the bar (35) of the support platform (33) which, in turn, has at least two antilocking platters (40) and (40a) (see FIG. 6) installed on the lower face; the platter (40) is mounted adjacent the cylindrical end (35a), acting as a structural reinforcement. The free end of the bar (35) is mounted, as also mentioned, on a pair of bearings (50) allowing free rotation pivoting in 90° upwardly from the support platform (33) relative to the crankset (14), allowing the spatial reduction of the width of the elliptical bicycle.

The association of all joints resulting from the hinges (D1), (D2), (D3) and (D4) comprises the dimensional compaction of the elliptical bicycle (10).

Of course, when the present invention is put into practice, modifications may be made with respect to certain details of the construction and shape, without departing from the fundamental principles which are clearly substantiated in the context of the claims, being understood that the terminology employed was not intended to limit the invention,

The invention claimed is:

1. An elliptical bicycle comprising:
    a structural frame having two stringers in opposing arcs, being one upper and the other lower, each of the upper and lower stringers being divided into two stringer segments;
    a front wheel;
    a rear wheel driven by a crankset;
    first and second support platforms, each of the two support platforms including a support bar having an end installed in a pair of double bearings disposed in the region of the rear wheel;
    a tubular segment formed by a fork, a steering tube, and a handlebar;
    a set of main hinges having an articulation at an approximate angle of up to 170°, the set of main hinges including
        an upper main hinge applied to the two segments of the upper stringer, and
        a lower main hinge applied to the two segments of the lower stringer;
    a secondary hinge applied to two segments of the steering tube having an articulation at an approximate angle of up to 180°; and
    a set of tertiary hinges including
        a first tertiary hinge applied between the crankset and the first support platform,
        a second tertiary hinge applied between the crankset and the second support platform,
        each of the first and second tertiary hinges having an articulation at an approximate angle of up to 90° upwards.

2. The elliptical bicycle according to claim 1, wherein
    when the set of main hinges, the secondary hinge, and the set of tertiary hinges are pivoted to an assembled position, the elliptical bicycle occupies a first volume; and
    when the set of main hinges, the secondary hinge, and the set of tertiary hinges are pivoted to a compacted position, the elliptical bicycle occupies a second volume reduced by up to ⅓ compared to the first volume.

3. The elliptical bicycle according to claim 1, wherein
    each of the upper and lower main hinges includes two corresponding quadrangular plates of equal shape and size which, when closed, are kept juxtaposed;
    for each of the main hinges, a dimension of each of the two quadrangular plates slightly exceeds a diameter of a stringer segment, which in turn is integrated in an outer face of the plate in order to configure a reinforcement bulkhead in each of the stringer segments;
    for each of the main hinges, a vertical side edge of one of the two plates is joined by a pivot pin to a corresponding vertical side edge of the other plate, and the other edges are free to open and close pivoting up to 170°;
    for each plate, the upper edge and lower edge of the plate have semicircular recesses, which, when the plate is juxtaposed with its corresponding plate, comprise coaxial holes having a diameter compatible with a diameter of a stud, the stud being comprised of a spindle having a threaded end and a handle;
    for each of the upper and lower main hinges, the upper edges and lower edges are fixed by means of locks, to make the assembly of the hinges stable; and
    each of the locks has a central hole which, when coincident with the coaxial holes formed by the juxtaposed plates, allows the stud to be transposed until the threaded end reaches a nut, so as to lock each main hinge when the stud is tightened relative to the nut.

4. The elliptical bicycle according to claim 1, wherein the secondary hinge further includes
    two hollow disks, each having a diameter slightly larger than a diameter of the steering tube;
    for each disc, one side of the disc is joined to a corresponding side of the other disc by a pivot pin;
    for each disc, a side of the disc opposite the pivot pin has a central recess open to a hollow part of the disc, such that when the discs are joined and juxtaposed with each other the edges having the recesses form a hole; and
    a lock having a central hole which, when coaxially mounted relative to the hole formed by the recesses, allows passage of a threaded pin having a handle, the handle acting relative to a nut and a lock nut, the nut and the lock nut both being housed inside the hollow part of the discs.

5. The elliptical bicycle according to claim 1, wherein each of the tertiary hinge further includes:
    a circular bearing mounted on a rotation axis of the rod; and a cylindrical segment attached to an upper part of the circular bearing;
the cylindrical segment receives engagement of a cylindrical end of the support bar of one of the first and second support platforms;
each of the first and second platforms has at least two antilocking platters installed in its lower face, at least one of the two antilocking platters being mounted adjacent to the cylindrical end to act as a structural reinforcement; and
the end of the support bar mounted on the pair of double bearings allows free rotation of the support platform to pivot 90° upward relative to the crankset.

6. The elliptical bicycle according to claim 5, wherein the cylindrical segment is attached by welding to the upper part of the circular bearing.

\* \* \* \* \*